United States Patent
Park et al.

(10) Patent No.: US 7,725,641 B2
(45) Date of Patent: May 25, 2010

(54) MEMORY ARRAY STRUCTURE AND SINGLE INSTRUCTION MULTIPLE DATA PROCESSOR INCLUDING THE SAME AND METHODS THEREOF

(75) Inventors: Gi-Ho Park, Seoul (KR); Shin-Dug Kim, Goyang-si (KR); Jung-Wook Park, Seoul (KR); Jun-Kyu Park, Seoul (KR); Sung-Bae Park, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 307 days.

(21) Appl. No.: 11/806,593

(22) Filed: Jun. 1, 2007

(65) Prior Publication Data
US 2008/0114921 A1   May 15, 2008

(30) Foreign Application Priority Data
Nov. 15, 2006  (KR) ............... 10-2006-0112964

(51) Int. Cl.
*G06F 12/00* (2006.01)
(52) U.S. Cl. .................... 711/5; 711/157; 711/155; 711/E12.055; 711/E12.079
(58) Field of Classification Search .......... 711/154
See application file for complete search history.

(56) References Cited

U.S. PATENT DOCUMENTS

| | | | |
|---|---|---|---|
| 5,400,087 A | 3/1995 | Uramoto et al. | |
| 5,448,310 A | 9/1995 | Kopet et al. | |
| 6,356,988 B1 * | 3/2002 | Takizawa | 711/202 |
| 6,950,469 B2 | 9/2005 | Karczewicz et al. | |
| 7,092,526 B2 | 8/2006 | Lee | |
| 2003/0126351 A1 * | 7/2003 | Park | 711/5 |
| 2006/0047937 A1 * | 3/2006 | Selvaggi et al. | 711/220 |

FOREIGN PATENT DOCUMENTS

| | | |
|---|---|---|
| JP | 05-290188 | 11/1993 |
| KR | 1020020095755 A | 12/2002 |
| KR | 10-2003-0014023 | 2/2003 |
| KR | 1020040036902 | 5/2004 |
| WO | WO 2003/026296 A1 | 3/2003 |

OTHER PUBLICATIONS

Chun-Ja Park et al., "Conflict-Free Memory System for Subarray Access", vol. 29, No. 1, pp. 43-45 (2002) and English abstract thereof.
Chun-Ja Park et al., "Conflict-Free Memory System for 9-Types Subarray Access", pp. 695-698 (2002) and English abstract thereof.

* cited by examiner

*Primary Examiner*—Reginald G Bragdon
*Assistant Examiner*—Arvind Talukdar
(74) *Attorney, Agent, or Firm*—Harness, Dickey & Pierce, P.L.C.

(57) ABSTRACT

A memory may be configured to rearrange and store data to enable a conflict free mode for a memory access pattern required by a coder-decoder(codec) and configured to output a plurality of data from a plurality of banks of the memory in parallel. In addition, a data interconnection unit is configured to shift the plurality of data output from the memory and provide the shifted data to a plurality of operation units as input data. The operation result from each of the plurality of operation units is stored in a region of the memory.

12 Claims, 10 Drawing Sheets

Fig. 1

(PRIOR ART)

| Bank Number N | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 12 | 13 | 14 | 15 | 8 | 9 | 10 | 11 | 4 | 5 | 6 | 7 | 0 | 1 | 2 | 3 |
| 2 | 8 | 9 | 10 | 11 | 12 | 13 | 14 | 15 | 0 | 1 | 2 | 3 | 4 | 5 | 6 | 7 |
| 3 | 4 | 5 | 6 | 7 | 0 | 1 | 2 | 3 | 12 | 13 | 14 | 15 | 8 | 9 | 10 | 11 |
| 4 | 15 | 11 | 7 | 3 | 14 | 10 | 6 | 2 | 13 | 9 | 5 | 1 | 12 | 8 | 4 | 0 |
| 5 | 11 | 7 | 3 | 15 | 10 | 6 | 2 | 14 | 9 | 5 | 1 | 13 | 8 | 4 | 0 | 12 |
| 6 | 7 | 3 | 15 | 11 | 6 | 2 | 14 | 10 | 5 | 1 | 13 | 9 | 4 | 0 | 12 | 8 |
| 7 | 3 | 15 | 11 | 7 | 2 | 14 | 10 | 6 | 1 | 13 | 9 | 5 | 0 | 12 | 8 | 4 |
| 8 | 14 | 10 | 6 | 2 | 13 | 9 | 5 | 1 | 12 | 8 | 4 | 0 | 15 | 11 | 7 | 3 |
| 9 | 10 | 6 | 2 | 14 | 9 | 5 | 1 | 13 | 8 | 4 | 0 | 12 | 11 | 7 | 3 | 15 |
| 10 | 6 | 2 | 14 | 10 | 5 | 1 | 13 | 9 | 4 | 0 | 12 | 8 | 7 | 3 | 15 | 11 |
| 11 | 2 | 14 | 10 | 6 | 1 | 13 | 9 | 5 | 0 | 12 | 8 | 4 | 3 | 15 | 11 | 7 |
| 12 | 13 | 9 | 5 | 1 | 12 | 8 | 4 | 0 | 15 | 11 | 7 | 3 | 14 | 10 | 6 | 2 |
| 13 | 9 | 5 | 1 | 13 | 8 | 4 | 0 | 12 | 11 | 7 | 3 | 15 | 10 | 6 | 2 | 14 |
| 14 | 5 | 1 | 13 | 9 | 4 | 0 | 12 | 8 | 7 | 3 | 15 | 11 | 6 | 2 | 14 | 10 |
| 15 | 1 | 13 | 9 | 5 | 0 | 12 | 8 | 4 | 3 | 15 | 11 | 7 | 2 | 14 | 10 | 6 |

Address Number Inside Nth Bank

▨ The Row Access Pattern
▨ The Column Access Pattern
▨ The Block Access Pattern

Fig. 4

16-pixel row block data access

Fig. 5

16-pixel column block data access

Fig. 6

4x4-pixel block(4m,n) access

Fig. 7

4x4-pixel block(4m+j,4n+k) access

MEMORY ARRAY STRUCTURE AND SINGLE INSTRUCTION MULTIPLE DATA PROCESSOR INCLUDING THE SAME AND METHODS THEREOF

PRIORITY STATEMENT

This U.S. non-provisional patent application claims the benefit of priority under 35 U.S.C. §119 to Korean Patent Application No. 10-2006-0112964 filed on Nov. 15, 2006, in the Korean Intellectual Property Office, the entire contents of which are incorporated herein in their entirety by reference.

BACKGROUND

1. Field

Example embodiments may relate to image processors, and for example, to a single-instruction multiple-data (SIMD) processor used in processing images, a memory structure, and/or a method for storing data in the memory structure.

2. Description of Related Art

With technical advancements for digital signal processing, storage media, and transmission modes, technical services localized to voice information have evolved into multimedia solutions. For example, in the development of terminal apparatuses and multimedia service areas such as digital televisions, internet protocol televisions (IPTVs), and video-on-demand (VOD), compression/restoration techniques have been utilized, e.g., H.264, for higher quality images or pictures. However, because a higher-quality image compression/restoration technique may consume a higher quantity of operations than a normal mode, a higher-quality image compression/restoration technique may increase a demand for a programmable hardware structure as a video coder-decoder (for example, a video codec) solution for assisting a standard of multiple image compression in accordance with convergence of functions and services.

To meet the demand for the programmable hardware structure, various platform patterns of application-specific integrated circuits (ASICs) or digital signal processors (DSPs) were developed for image compression and/or restoration. However, these hardware structures may have problems of compatibility and/or increased costs. In order to overcome such problems, single-instruction multiple-data (SIMD) processors that offer higher efficiency and/or a lower cost were developed. A conventional SIMD processor may accept a single instruction in common for a plurality of SIMD arrays through processing elements (PEs) each provided in the SIMD array, and/or execute the received instruction in parallel. Each PE may include an operation circuit such as an arithmetic and logic unit (ALU).

Figure 1:
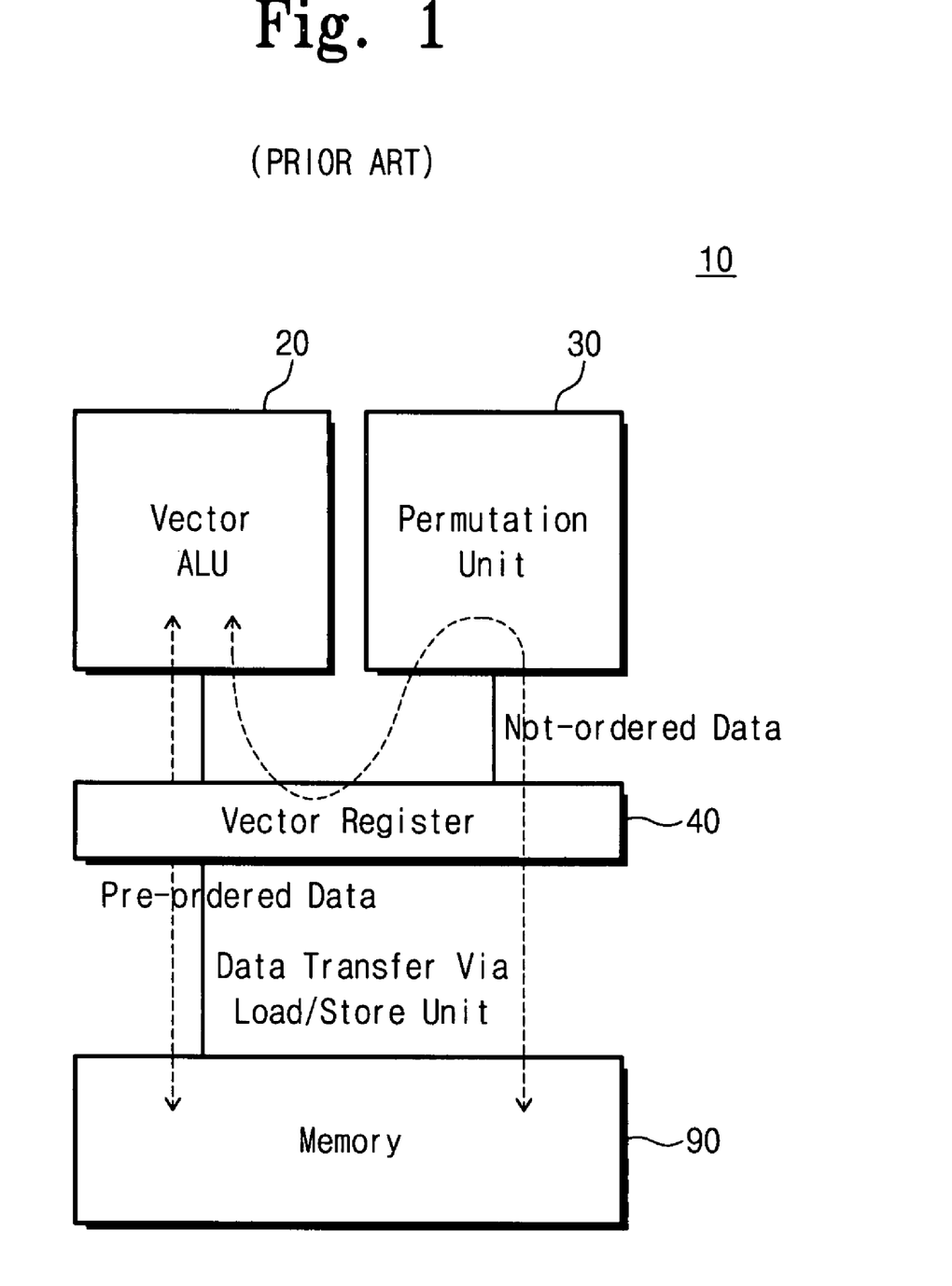
FIG. 1 is a block diagram showing a structure of a prior art SIMD processor.

As the conventional SIMD processor processes a plurality of data with a single instruction, the conventional SIMD processor may be able to more easily enhance data processing capability. For example, the conventional SIMD processor may be suitable for a repetitive routine with strong parallelism in operation, and the conventional SIMD processor is widely employed in processing multimedia, graphics data, or voice communications. There are various kinds of conventional SIMD processors, e.g., MMX, SSE, MAX-1, MAX-2, and Altivec. In efficiently utilizing a parallel processing architecture, such as an arrayed processing structure or a very long instruction word (VLIW) represented by SIMD, data may need to be supplied with an arrangement that allows available operation units to be normally enabled in operation. Accordingly, a conventional SIMD processor may be internally associated with a permutation unit as a circuit for arranging data within the conventional SIMD processor. FIG. 1 shows a general structure of a prior art SIMD processor 10.

Referring to FIG. 1, the prior art SIMD processor may include a vector arithmetic and logic unit (vector ALU) 20, a permutation unit 30, a vector register 40, and/or a memory 90. While FIG. 1 depicts one of the vector arithmetic and logic units (vector ALUs) 20, processing parallel data at a relatively higher frequency (e.g., fast parallel data processing) requires a plurality of the vector ALUs 20 coupled with each other in parallel. Responding to an input of an instruction, the prior art SIMD processor 10 may load and store data from a memory 90 into a vector register 40. Data stored in the vector register 40 may be rearranged through the permutation unit 30 and provided to the vector ALU 20. The vector ALU 20 may process the rearranged data provided from the permutation unit 30. The permutation unit 30 may be used with a crossbar or battery network to rearrange data for global multimedia operations.

A technique known as the 'conflict free' technique may arrange data so as to make access to a memory bank of a simple linear array in various parallel modes permissible. Data rearrangement or reassignment by the conflict free technique is carried out through the permutation unit 30. The permutation unit 30 may execute operations of multiplexing, shifting, and/or rotations by complex permutation networks and plural stages. Therefore, data rearrangement may take a relatively long amount of time. Accordingly, a higher cost for accessing the memory 90 and/or a longer data rearrangement time through the permutation unit 30 may reduce the operational efficiency of the prior art SIMD processor.

SUMMARY

Example embodiments may provide a memory array structure configured to enhance an operation speed, and/or a SIMD processor including the same.

Example embodiments may provide a memory array configured to reduce a cost for accessing a memory by an operation device, and/or a SIMD processor including the same.

Example embodiments may provide a method for storing data in a memory structure and/or a method of accessing the data stored in the memory structure.

According to an example embodiment, a memory array may include a memory configured to rearrange and store data to enable a conflict free mode for a memory access pattern required by a coder-decoder.

According to an example embodiment a single-instruction multiple-data processor may include a plurality of operation units, the memory array, and/or a data interconnection unit. The plurality of operation units may be configured to execute parallel operations with input data. The data interconnection unit may be configured to shift a plurality of data output from the memory in a data access operation, and/or correspondingly provide the shifted data to the plurality of operation units as the input data.

According to an example embodiment, the memory may include a plurality of banks rearranging and storing the data to enable the conflict free mode for the memory access pattern required by the coder-decoder.

According to an example embodiment, each of the plurality of operation units may include a register configured to store a corresponding portion of the input data provided from the data interconnection unit.

According to an example embodiment, the input data stored in the register may be reused in a next data operation after being used in a current data operation.

According to an example embodiment, an operation result from each of the plurality of operation units may be stored in a region of the memory.

According to an example embodiment, the operation result stored in the region of the memory may be loaded and reused in each of the plurality of operation units.

According to an example embodiment, the memory access pattern may include a horizontal memory access pattern, a vertical memory access pattern, and/or a block memory access pattern. The horizontal memory access pattern may be configured to simultaneously output a plurality of data belonging to a row of a macro block. The vertical memory access pattern may be configured to simultaneously output a plurality of data belonging to a column of the macro block. The block memory access pattern may be configured to simultaneously output a plurality of data belonging to a region of the macro block.

According to an example embodiment, the memory may include a plurality of banks configured to store data corresponding to each of the operation units.

According to an example embodiment, the memory may simultaneously output one data from each of the plurality of banks in one cycle of the data access operation.

According to an example embodiment, the memory may be configured with N internal addresses and each the internal addresses corresponds to N bank numbers. N may be an integer greater than 0.

According to an example embodiment, a start bank number of a data stream stored in each internal address number may be shifted by four bank numbers if the internal address number increases by one.

According to an example embodiment, a first internal address y of the memory may be (x %16)×16 if first data of a data stream is x, and/or a start bank number corresponding to the first internal address y may be y/4+4(y %4).

According to an example embodiment, the data interconnection unit may include a plurality of barrel shifters configured to shift the data output from the memory by a number of bits.

According to an example embodiment, the number of bits shifted in the plurality of barrel shifters may be determined by a start bank number corresponding to an internal address number of the memory.

According to an example embodiment, the processor may perform one of interpolation, motion estimation, and discrete cosine transform/inverse discrete cosine transform required by the coder-decoder.

According to an example embodiment, the coder-decoder may be a video coder-decoder.

According to an example embodiment, the data stored in the plurality of banks may be simultaneously provided to a plurality of operation units configured to process a plurality of data in parallel.

According to an example embodiment, a method for storing data in a memory array may include rearranging and storing data in a memory to enable a conflict free mode for a memory access pattern required by a coder-decoder.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when a component is referred to as being "on," "connected to" or "coupled to" another component, it can be directly on, connected to or coupled to the other component or intervening components may be present. In contrast, when a component is referred to as being "directly on," "directly connected to" or "directly coupled to" another component, there are no intervening components present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one component or feature's relationship to another component(s) or feature(s) as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

A single-instruction multiple-data processor (i.e., an SIMD processor) according to an example embodiment may include a memory in which data are disposed to enable a conflict free mode restricted to a memory access pattern essentially required for a coder-decoder (for example, a codec; for example, a video codec). The data stored in the memory may be directly provided to corresponding operation units through data interconnections configured to simultaneously shift plural data bits. Accordingly, a cost for accessing the memory of the operation unit may be reduced, and/or there may be no need to implement a permutation logic structure as an additional data rearrangement means, thereby simplifying circuit architecture and/or reducing a cost of fabrication.

Figure 2:
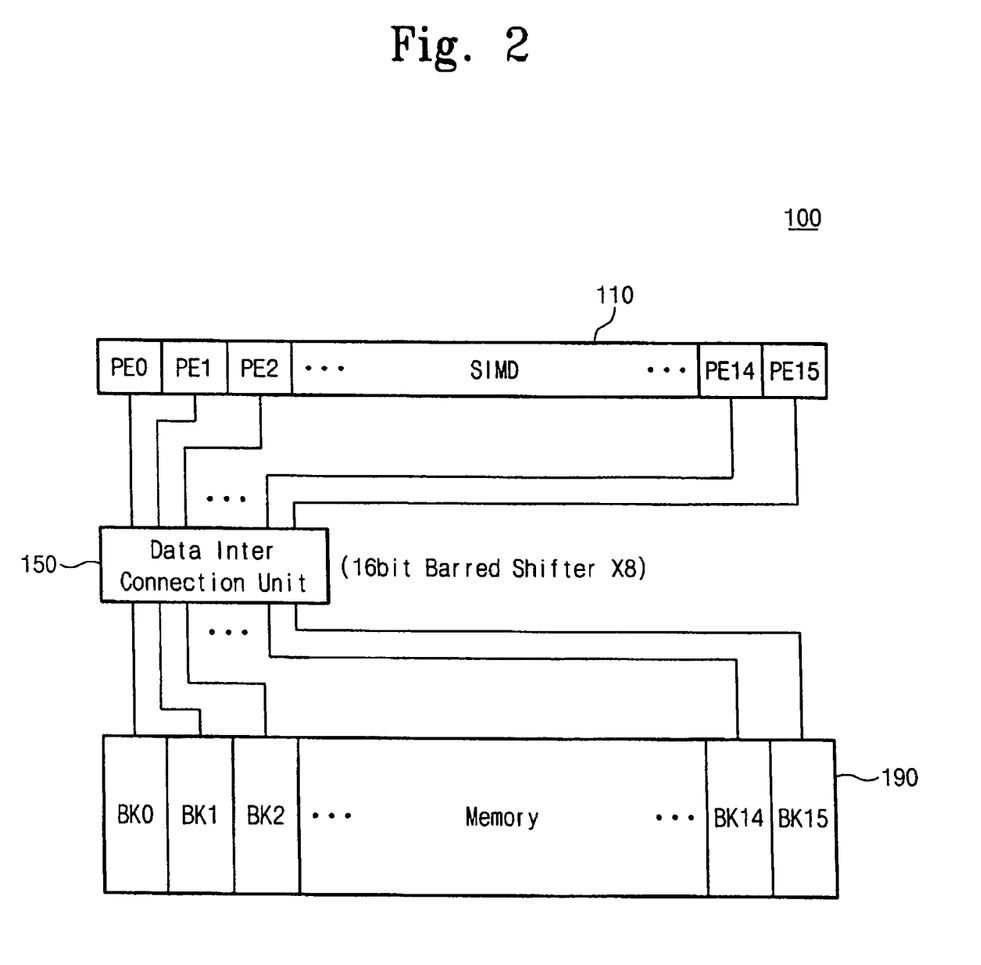
FIG. 2 is a diagram illustrating a structure of an SIMD processor in according to an example embodiment.

FIG. 2 is a diagram illustrating a structure of an SIMD processor 100 according to an example embodiment. The SIMD processor 100 may be configured to process sixteen 8-bit pixel data in parallel. The SIMD processor 100 may be applicable to a video codec according to a higher-quality image compression/restoration standard, e.g., H.264, with a larger quantity of operations. However, example embodiments are not limited thereto and the SIMD processor 100 may be configured to process different configurations of data in parallel and/or may be applicable to a codec other than a video codec.

Referring to FIG. 2, the SIMD processor 100 may include an SIMD array 110, a data interconnection unit 150, and/or a memory 190. The SIMD array 110 may include a plurality of operation units PE0~PE15 (16 members) each of which may include an ALU and/or a register. The data interconnection unit 150 may function to connect data from the memory 190 to the operation units PE0~PE15 correspondingly.

The memory 190 may act as a buffer memory for temporarily storing pixel data to be used in image processing operations. The memory 190 may be formed of a randomly accessible memory, for example a SRAM. However, example embodiments are not limited thereto, and the memory 190 may be implemented in another kind of memory. As will be described later, data to be dealt by the SIMD processor 100 may be stored in the memory 190 after being rearranged by the conflict free technique. An operation for rearranging data to be stored in the memory 190 may be carried out by a control logic block (not shown) that controls an overall operation of the SIMD processor 100. The rearrangement operation of data to be stored in the memory 190 will be detailed in conjunction with Equations 1 and 2 hereinafter.

A data storage field for image data in the memory 190 may be divided into 16 banks BK0~BK15. Each bank may be designed to output one data for one cycle. According to a result of the data rearrangement according to an example embodiment, the memory 190 may be able to output 16 pixel data in one cycle in parallel without a conflict between data of the banks BK0~BK15. Accordingly, the data rearrangement may reduce a cost for accessing the memory by the operation unit, and/or a time for loading data. Data stored in the memory 190 may be data stored after being rearranged in accordance with a desired, or alternatively a predetermined data permutation rule. Therefore, the SIMD processor 100 according to an example embodiment may not needed an additional permutation unit for rearranging data. The SIMD processor 100 of example embodiments may improve a data loading speed and/or simplify a hardware organization.

The memory 190, which may store data rearranged by the conflict free technique, may output a plurality of data (e.g., 16 data) at the same time for one cycle. A plurality of data output from the memory 190 may be shifted through the data interconnection unit 150 and/or provided to the operation units PE0~PE15 corresponding thereto. As will be detailed hereinafter, the data provided to the operation units PE0~PE15 may be operable with all of the various macro blocks (e.g., 16×16, 8×8, 8×4, 4×8, 4×4) used in the standard of H.264. Each operation unit may include a register for storing data provided from the data interconnection unit 150. Data stored in the register (or a memory unit corresponding thereto) of the operation unit may be reused in an operation executed by the video codec. Accordingly, the complexity of operations may be reduced and/or the whole operation speed may be accelerated as a frequency of reusing data increases.

The data interconnection unit 150 may include a plurality of 16-bit barrel shifters, for example the data interconnection unit 150 may include 8 16-bit barrel shifters each transferring 8-bit pixel data. Each barrel shifter may b a hardware unit able to shift or rotate a plurality of bits of a data word through one stage of operation. For example, each 16-bit barrel shifter may be able to shift data by 16 bits at to the left or right for one cycle. Accordingly, data output from the memory 190 may be provided to the operation units PE0~PE15 in a shorter time through the data interconnection unit 150.

The video codec may usually execute an operation with an image formed of two-dimensional pixels. The operation units PE0~PE15 may be free from directions of operation. However, accessing the memory for conducting the operation may inevitably be restricted to a desired, or alternatively, a predetermined pattern (e.g., crosswise, lengthwise, or diagonal direction). Therefore, the example embodiments may arrange data in the memory 190, by means of such image processing characteristics, so as to enable a conflict free mode restricted to a memory access pattern essentially required by the video codec. Accordingly, the SIMD processor according to an example embodiment may be able to effectively rearrange data to be used in the image processing while minimizing hardware structure. For example, the SIMD processor 100 of an example embodiment may be able to continuously provide data to the operation units PE0~PE15 in parallel without including the permutation unit 30 that executes data rearrangement between the operation units PE0~PE15 and the memory 190. Pluralities of data output from the memory 190 may be directly provided to the operation units PE0~PE15, corresponding thereto, through the data interconnection unit 150. Accordingly, a cost for implementing a structure of permutation logic and/or a cost for accessing the memory by the operation unit may be reduced.

Data provided to the operation units PE0~PE15 from the memory 190 may be stored in the registers included in each of the operation units, and/or the stored data may be reusable in repetitive operations. Accordingly, the reusability of data may be raised, and/or the efficiency of operation may be enhanced. As the reuse of data removes the necessity of reloading data, a time consumed by data loading may be shortened. The reusability of data is applicable to reusing pixel data themselves and/or reusing operation results. For example, a quantity of operations may be reduced to enhance the efficiency of operation in the SIMD processor from reusing operation results or intermediate operation results.

Figure 3:
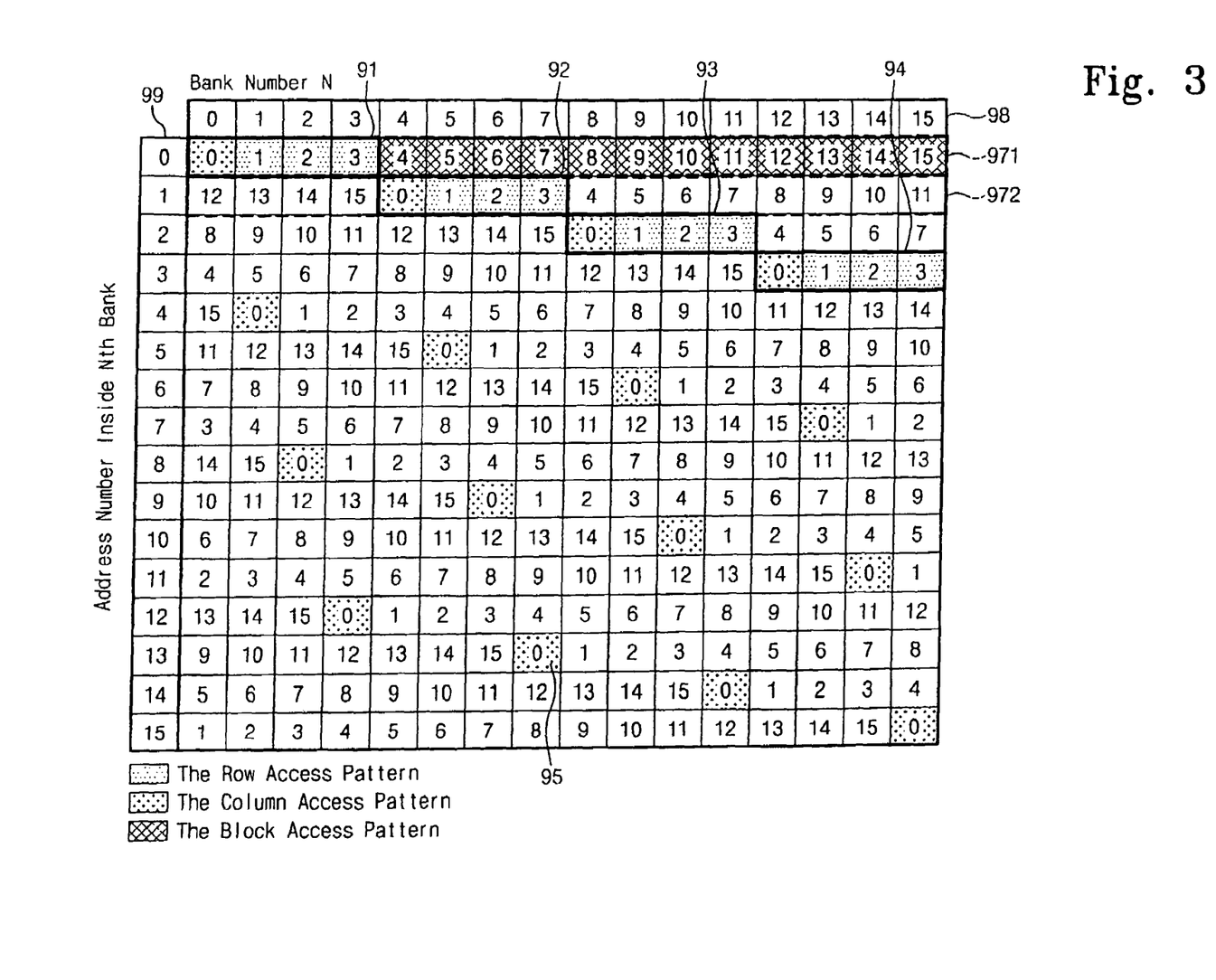
FIG. 3 is a diagram showing an example data arrangement of the memory shown in FIG. 2.

FIG. 3 is a diagram showing an example data arrangement of the memory 190 shown in FIG. 2. FIG. 3 shows an example data arrangement of the memory 190 storing macro block data with a size of 16×16 by means of the conflict free technique.

A horizontal axis 98 of the data arrangement shown in FIG. 3 denotes bank numbers N of the memory 190, while a vertical axis 99 of the data arrangement denotes internal address numbers corresponding to each bank. A reference numeral 95 marked on the data arrangement represents a column access pattern, while reference numerals 971 and 972 represent row access patterns of the memory 190. Reference numerals 91~94 represent block access patterns. The data arrangement shown in FIG. 3 according to an example embodiment may be organized as follows.

Assuming the first data of a 16-bit data stream is x, a first address y is defined by Equation 1.

$$y=(x \%16)\times16 \qquad (1)$$

Equation 2 defines the start bank number N corresponding to the first address y, which is obtained from Equation 1, of the memory 190.

$$N=y/4+4\times(y \%4) \qquad (2)$$

Information about physical positions of the memory 190 storing image data to be processed may be determined by Equations 1 and 2. One of the internal address numbers corresponds with 16 bank numbers. A starting point (i.e., the start bank number) of the 16-bit data stream, which may be stored each in the internal address number, may be shifted by four bank numbers if the internal address number increases by 1.

Figure 4:
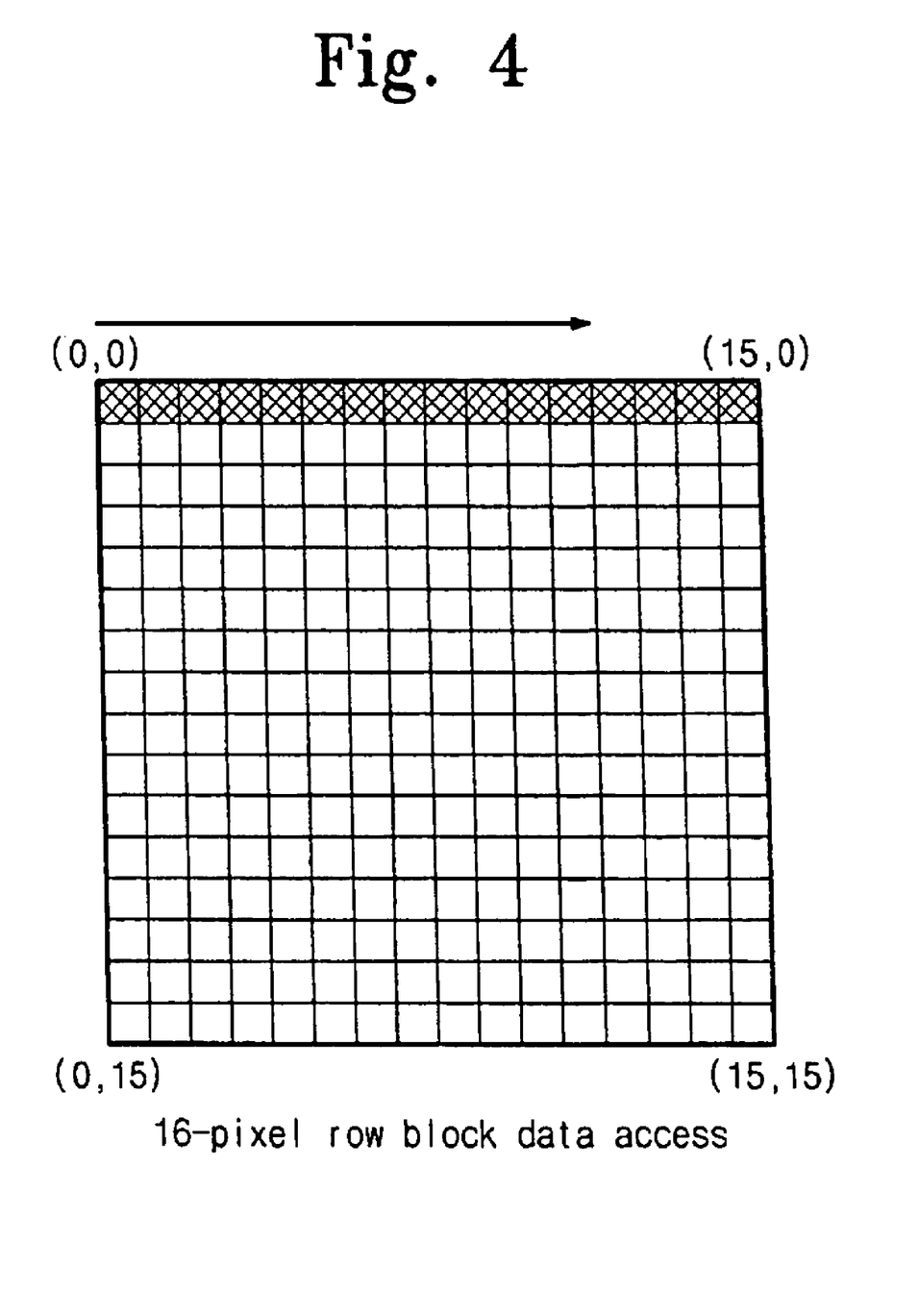
FIGS. 4 through 7 are diagrams showing example access modes and logical arrangements of image data to be processed according to an example embodiment.
Figure 5:
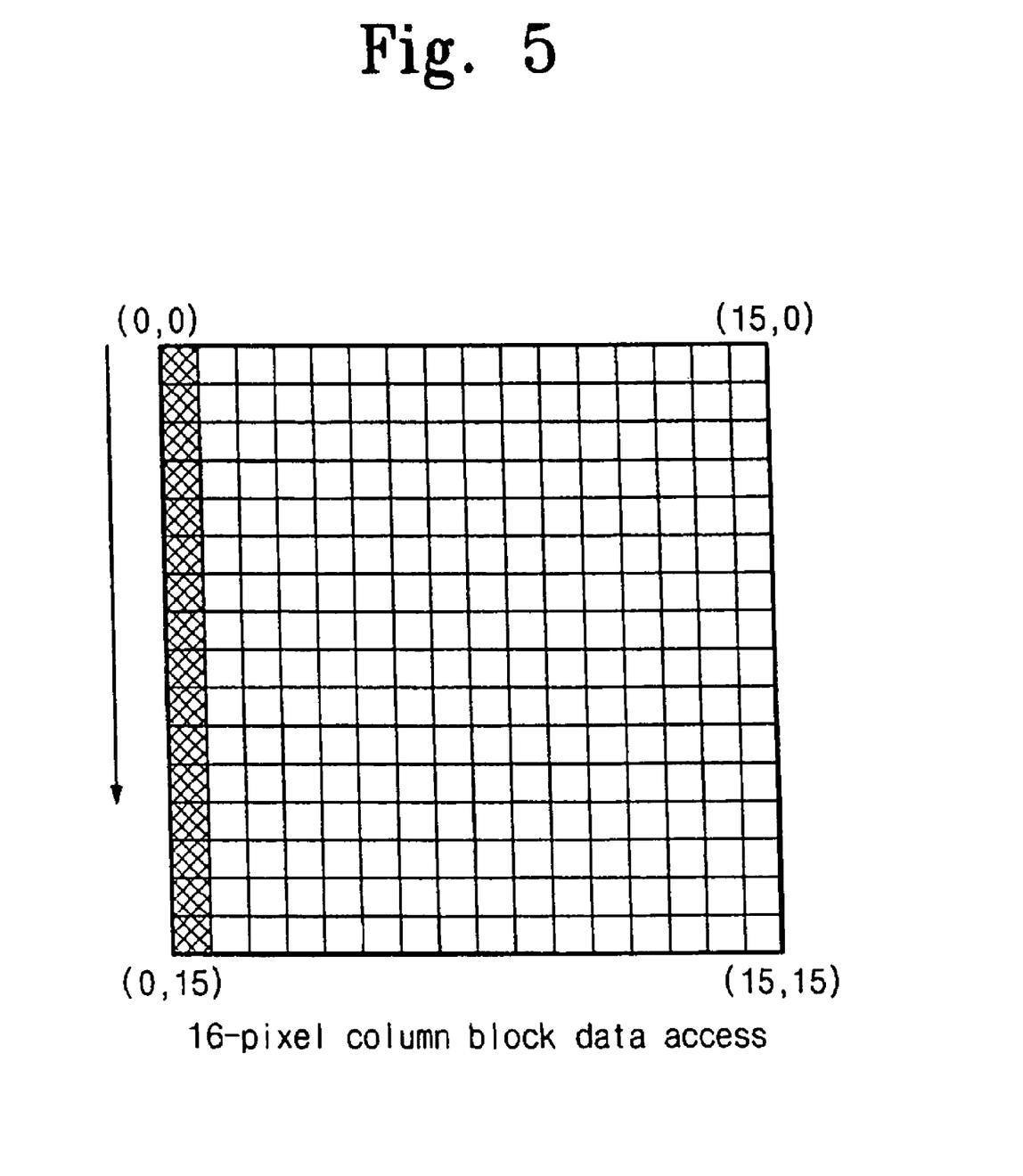
Figure 6:
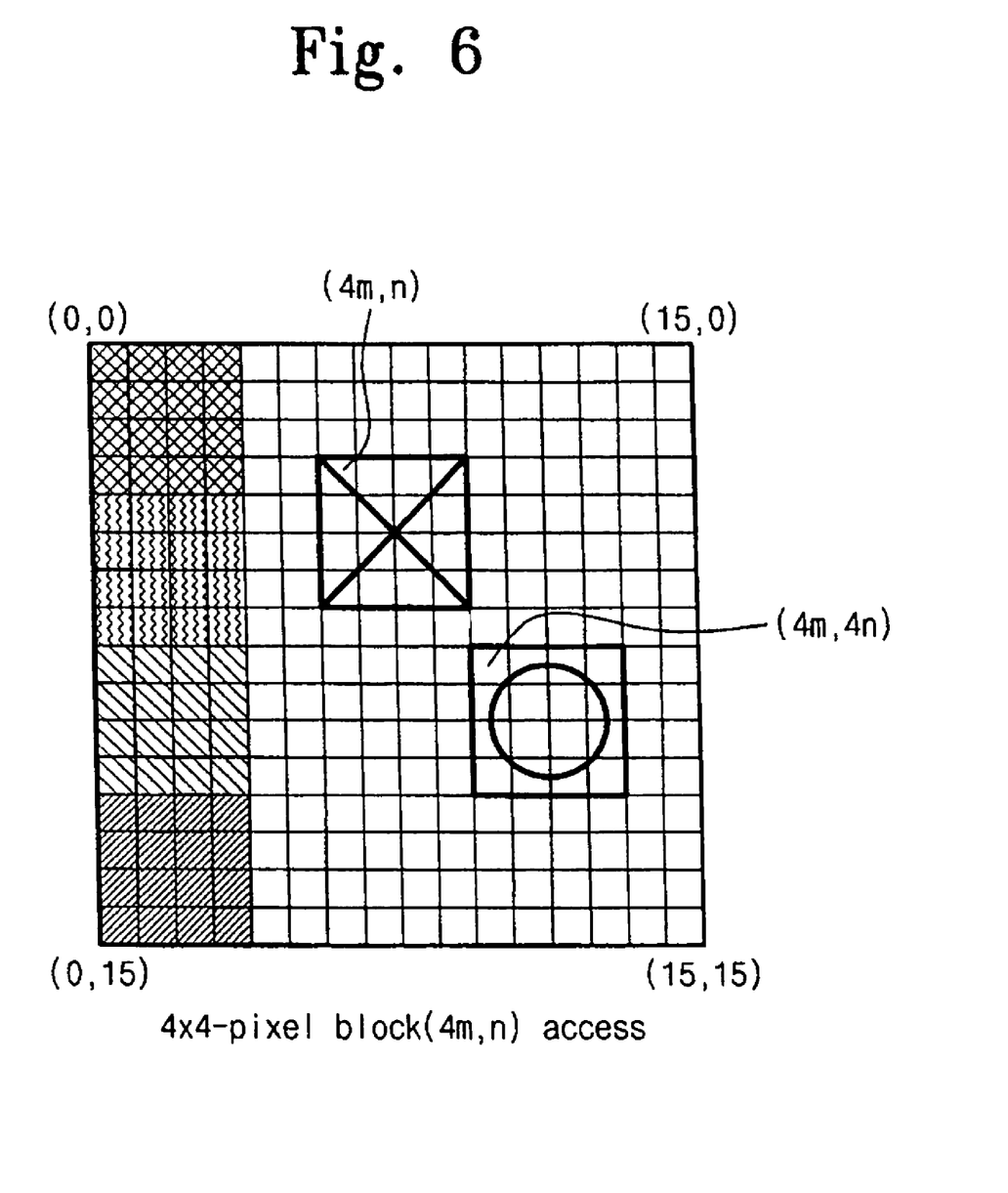
Figure 7:
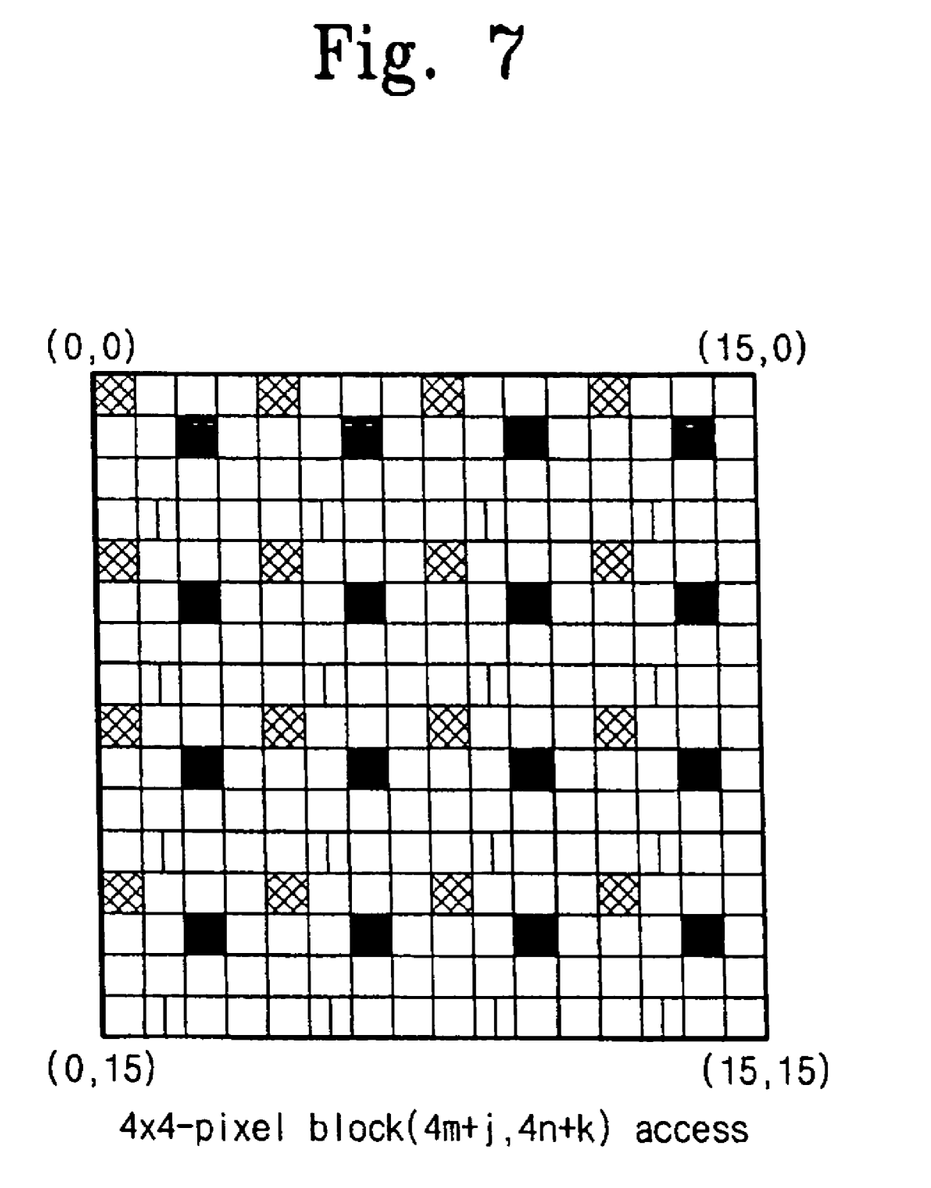

FIGS. 4 through 7 are diagrams showing access modes and logical dispositions of image data to be processed according to example embodiments. FIG. 4 shows accessing data by 16 pixels along the horizontal direction (or e.g., a row) in a macro block of 16×16, while FIG. 5 shows accessing data by 16 pixels along the vertical direction (or e.g., a column) in a macro block of 16×16. FIGS. 6 and 7 show accessing data by 16 pixels from a macro block of 4×4. A coordinate of a first pixel of the 4×4 macro block accessed as shown in FIG. 6 may be (4m, n) (0≦m, n≦3). A coordinate of a first pixel of the 4×4 macro block accessed as shown in FIG. 7 may be (4m+j, n+k) (0≦m, n, j, k≦3). The configurations of image data shown in FIGS. 4 through 6 may be data patterns mostly used in motion estimation and interpolation, while the configuration of image data shown in FIG. 7 may be a data pattern mostly used in discrete cosine transform (DCT) or inverse DCT. A data access mode of the memory 190 for processing image data shown in FIGS. 4 through 7 may be as follows.

Referring to FIGS. 3 and 4, while accessing data in the unit of a row (e.g., along the horizontal direction), data may be provided to the operation units PE0~PE15 from the memory 190 in the row access patterns 971 and 972. For example, 16-bit data of a first row corresponding to the row access pattern 971 may be output from the 16 banks BK0~BK15 for one cycle. The data output therefrom may match with each other in logical and physical positions. Therefore, 16-bit data (or 16 data bits) output from the memory 190 may be provided directly to the operation units PE0~PE15, corresponding thereto, through the data interconnection unit 150. 16-bit data of a second row corresponding to the row access pattern 972 may be output from the 16 banks BK0~BK15 for one cycle. The data output therefrom may be different from each other by 4 banks (i.e., 4 bits) in logical and physical positions. Accordingly, the 16-bit data output from the memory 190 may be shifted by 4 bits through the data interconnection unit 150 and provided to the operation units PE0~PE15 corresponding thereto. This data-shifting operation of the data interconnection unit 150 may be determined by the start position 95 of the data stream stored in the internal address number. Through repeating such a row-unit data access operation in 16 times, data corresponding to the 16×16 macro blocks may all be loaded into the operation units PE0~PE15.

Referring to FIGS. 3 through 5, while accessing data in the unit of column (e.g., along the vertical direction), data may be provided to the operation units PE0~PE15 from the memory 190 in the column access pattern as in reference numeral 95. In FIG. 3, the reference numeral 95 exemplarily shows just one of the 16 data storage regions (see the shadow portions) simultaneously accessed from the 16 banks BK0~BK15. Data with the same number (0 through 15) marked on the data storage regions may be accessed by the 16 banks BK0~BK15 at the same time. For example, data belonging to the same column access pattern (i.e., data with the same number on the data storage regions) may be configured to be shifted by four banks (i.e., 4 bits) every change of an internal address. Because even data belonging logically to the same column as shown in FIG. 5 are physically distributed in the banks BK0~BK15 of the memory 190, 16 data bits may be output at the same time for one cycle. For example, as 16 data bits with the same number '0' marked on the data storage regions are uniformly distributed in the 16 banks BK0~BK15, the 16 data bits with the same number '0' marked on the data storage regions may be simultaneously output for one cycle during an access operation. The 16 data bits output from the memory 190 at the same time may be shifted by desired, or alternatively, predetermined bits through the data interconnection unit 150 and/or provided to the operation units PE0~PE15 corresponding thereto. The number of bits shifted through the data interconnection unit 150 may be determined by the start position 95 of the data stream stored in the internal address number. After repeating such a column-unit data access operation 16 times, data corresponding to the 16×16 macro blocks may all be loaded into the operation units PE0~PE15.

Unless data bits belonging to the same column access pattern are uniformly distributed over the 16 banks BK0~BK15, the 16 data bits may be impossible to output at the same time for one cycle during an access operation. For example, in the conventional SIMD processor 10 that loads 16-bit data of the same column, loading 16 data bits of the same column shown in FIG. 5 is required for accessing the memory for 16 cycles. Accordingly, the SIMD processor 100 according to an example embodiment may be more effective in enhancing an access speed, by the rate about 16 times, than the conventional SIMD processor 10. The SIMD processor 100 according to an example embodiment may be able to load 16-bit data, which belongs to the same row or column in a time, from the memory 190 in a time, and load 16-bit data, which belongs to a block (e.g., the 44 macro block), from the memory 190 in a time. This may be called 'block-unit accessing'.

Referring to FIGS. 3 and 6, for data access in the unit of a block, 16-bit pixel data distributed in the block access patterns 91~94 may be provided to the operation units PE0~PE15 from the memory 190. In FIG. 3, the reference numerals 91~94 exemplarily represent 16 data storage regions which may be accessed from 16 banks BK0~BK15 at the same time. In a block access operation, 4-bit data may be successively accessed for each internal address number on a desired, or alternatively, a predetermined position (4m, 4n). For example, 16 data bits belonging to a 4×4 macro block may be stored separately in the banks BK0~BK15. Therefore, 16 data bits (i.e., 16-bit data) belonging to a 4×4 macro block may be output at the same time from the banks BK0~BK15 for one cycle. The 16-bit data simultaneously output from the memory 190 may be shifted by desired, or alternatively, predetermined bits through the data interconnection unit 150 and/or provided to the operation units PE0~PE15. The number of bits shifted in the data interconnection unit 150 may be determined by the start position 95 of the data stream stored in each internal address number. The image standard H.264 may be operable with various macro blocks such as 8×8, 4×8, or 8×4. Through repeating the data access operation twice in the unit of a 4×4 block, data may be accessed in correspondence with the 4×8 or 8×4 macro block. Similarly, accessing data of an 8×8 macro block may be carried out by repeating data access operations four times in the unit of a 4×4 block.

The aforementioned data access pattern in the unit of a block may be applicable even to data distributed over the whole area as shown in FIG. 7, as well as data crowding in a desired, or alternatively, a predetermined region as illustrated in FIG. 6. However, in the block-unit data access pattern as described by FIG. 6, if a start address of a block to be accessed is not all a multiple of 4, e.g., (4m, n), the aforementioned block-unit data access operation may be impossible to accomplish. To the contrary, in FIG. 7, if a start address of a block to be accessed is all a multiple of 5, e.g., (4m, 4n), the block-unit data access operation may be possible to accomplish.

The SIMD processor 100 of example embodiments, employing the feature of data arrangement according to the aforementioned conflict free mode, may be applicable to operations of interpolation and motion estimation for a 16×16 macro block by the H.264 image processing standard accompanying a great deal of computations. However, this configuration throughout this specification is just an example embodiment and the SIMD processor 100 of example embodiments may be applicable to various operations processing plural or multiple data (for example, image data) in parallel. Additionally, the SIMD processor 100 according to example embodiments is not restricted to an image processing standard such as H.264.

Hereinafter will be described an interpolation and motion estimation of the SIMD processor 100 of example embodiments for a 16×16 macro block.

To accomplish more accurate motion compensation, the H.264 standard may conduct motion estimation from generating a ½ pixel (half-pixel) and/or a ¼ pixel (quarter-pixel). The sub-pixel, e.g., the ½ or ¼ pixel, may be generated from executing an operation of interpolation with peripheral pixels. For example, the ½ pixel may be generated through interpolation with reference to 6 peripheral pixels. In horizontal interpolation, 6 pixels may be used, for example 3 each on the left and right of the sub-pixel, in total. If a horizontal memory access mode is only available for interpolation with the SIMD processor 100 including the 16 operation units PE0~PE15, interpolation for one row may be accomplished through accessing the memory in 6 times. These operations are repeated in 16 times, resulting in data access cycles of 96 times totally. However, if a vertical memory access mode is available therein, 6 memory access cycles may be first carried out for interpolation to a first column. 5 pixel data among the 6 pixel data used in the former interpolation may be reused in the interpolation for the next column. Accordingly, 21 memory access cycles may be enough to complete all of the interpolation operations. This characteristic of reusing data by the SIMD processor 100 according to example embodiments may reduce the number of memory access cycles during the vertical memory access mode, and/or enhance an operation speed of the SIMD processor 100.

Figure 8:
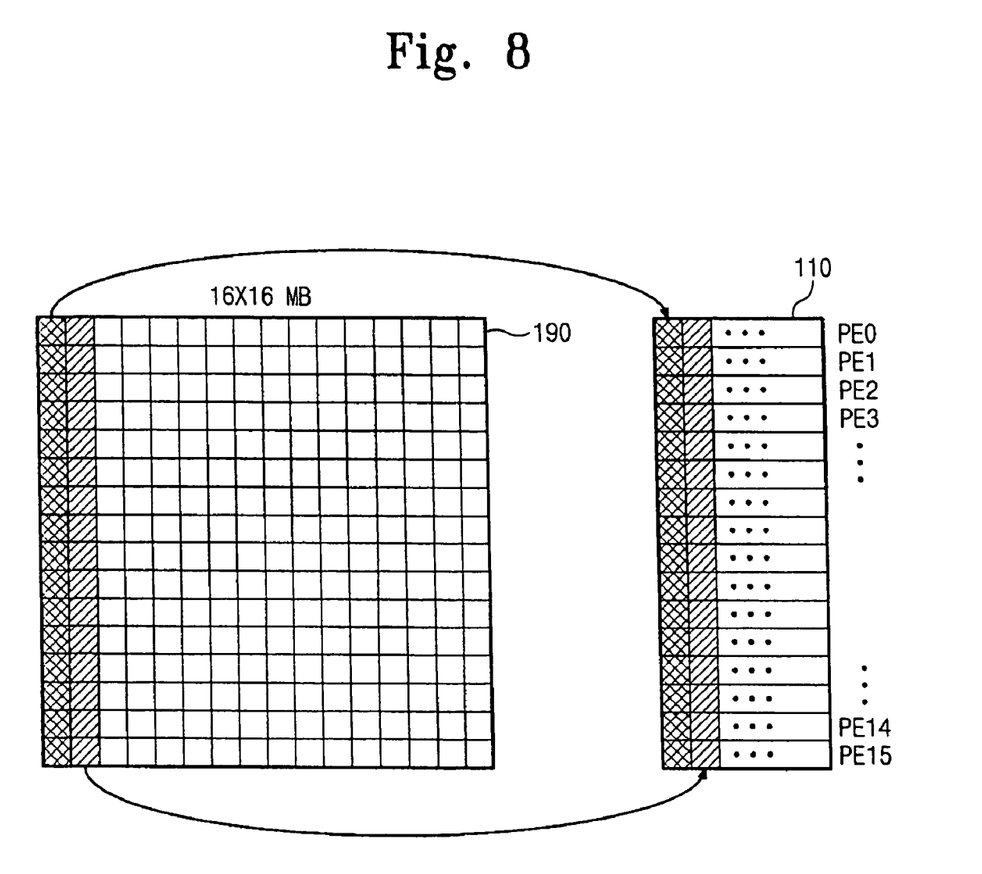
FIGS. 8 through 10 are diagrams illustrating a motion estimation of the SIMD processor according to an example embodiment.
Figure 9:
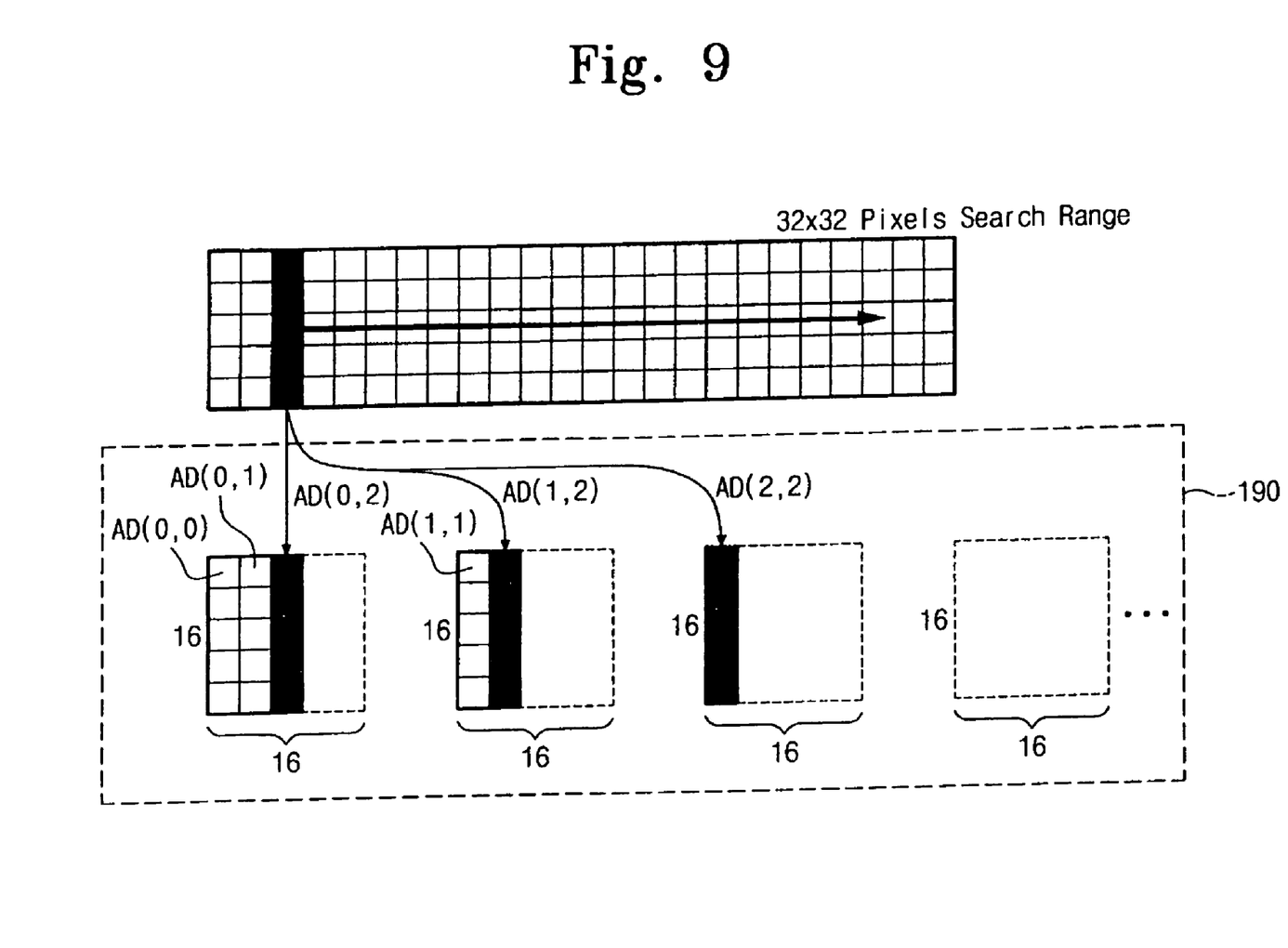
Figure 10:
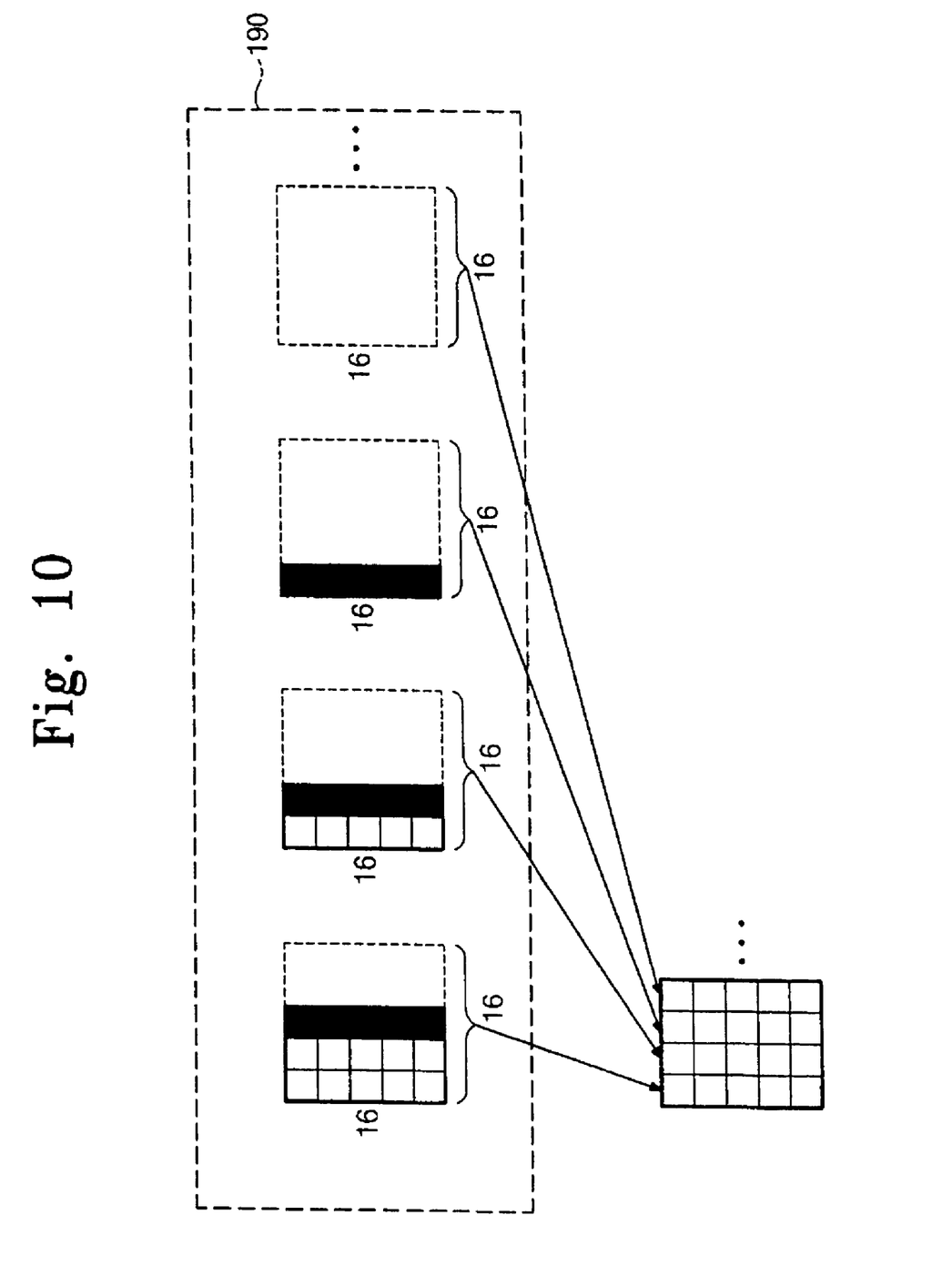

FIGS. 8 through 10 are diagrams illustrating a motion estimation of the SIMD processor 100 according to an example embodiment. The memory 190 of the SIMD processor 100, which may be used in motion estimation, may store data in accordance with the pattern of data arrangement shown in FIG. 3. According to the data storage scheme of example embodiments as illustrated in FIG. 3, a plurality of data may be output at the same time for a cycle without a conflict of data.

In executing motion estimation with the SIMD processor 100 of example embodiments, as illustrated in FIG. 8, data of a current macro block may be first loaded into the 16 operation units PE0~PE15 in sequence through a vertical memory access mode. The data loaded into the operation units PE0~PE15 may each be stored in registers included each in the operation units PE0~PE15. The operation units PE0~PE15 may store 16 8-bit pixel data corresponding to a row of the current macro block from the vertical memory access with sequence.

Referring to FIG. 9, if a motion search range is 32×32, absolute difference (AD) values for each row may be calculated by moving a coordinate therearound in order to find blocks most similar to plural blocks included in the search range. The AD values may be taken in parallel from the operation units PE0~PE15. For example, as the operation units PE0~PE15 each store 16 8-bit data corresponding to a row of the current macro block, the operation for calculating AD values may be carried out by means of the data stored therein. The AD values calculated from the operation units PE0~PE15 may correspond with intermediate results to obtain a sum of absolute differences (SAD) to be used for motion estimation. The AD values from the operation units PE0~PE15 may be stored in regions of the memory 190. The memory 190 may include a plurality of data storage regions in which the AD values from the operation units PE0~PE15 may be stored in sequence. For example, an AD value for a first row of the 16×16 macro block, AD(0,0), may be stored in a first storage region of the memory 190. AD values for a second row of the macro block, AD(0,1) and AD(1,1), may be stored each in first and second storage regions of the memory 190. AD values for a third row of the macro block, AD(0,2), AD(1,2), and AD(2,2), may be stored each in first through third storage regions of the memory 190. The AD values for the rows, which are stored in the first through third storage regions of the memory 190, may be obtained from reusing the previous results without resuming the SAD calculation.

Referring to FIG. 10, after calculating AD values for a row of a 32×32 search range by way of the aforementioned procedure shown in FIG. 9 (e.g., 32 cycles of calculating the AD values), 16 AD matrixes sized in 16×16 may be in the memory 190. The AD values may be loaded each into the operation units PE0~PE15 by successively conducting vertical memory access operations 16 times for the 16 AD matrixes. The operation units PE0~PE15 may add the AD values successively input thereto and/or evaluate an SAD value of the 16×16 macro block.

A conventional SIMD processor 10 may need an additional configuration with an adder tree as well as a plurality of cycle times for duplicate calculations. However, the SIMD processor 100 according to example embodiments may employ the data arrangement and reuse as described above according to example embodiments, and may not need an additional configuration with an adder tree as well as a plurality of cycle times for duplicate calculations. The SIMD processor 100 of example embodiments may execute an operation for calculating an SAD for motion estimation through the procedure of storing intermediate AD values, which may be to be used in the SAD calculation, by rows and/or reusing the stored AD values. Accordingly, the SIMD processor 100 of example embodiments may be able to reduce a frequency of memory access operations and/or a time for calculating an SAD value. For example, the SAD calculation result stored in the memory 190 may be processed on a basis of the feature of data arrangement described with reference to FIG. 3. Accordingly, a data loading time may be reduced even if a conflict between data provided from the operation units PE0~PE15 is prevented. The memory 190 shown in FIG. 9 or 10 may be provided in addition to or included in the memory 190 as shown in FIG. 2.

According to example embodiments described above, an operation speed of the SIMD processor may be enhanced. Example embodiments may reduce a cost for accessing the memory of the operation unit in the SIMD processor.

Although example embodiments have been shown and described in this specification and figures, it would be appreciated by those skilled in the art that changes may be made to the illustrated and/or described example embodiments without departing from their principles and spirit.

What is claimed is:

1. A single-instruction multiple-data processor comprising:
   a plurality of operation units configured to execute parallel operations with input data;
   a memory configured to rearrange and store data enable a conflict free mode for a memory access pattern required by a coder-decoder(codec) and configured to output a plurality of data from a plurality of banks of the memory in parallel; and
   a data interconnection unit configured to shift the plurality of data output from the memory in a data access operation, and correspondingly provide the shifted data to the plurality of operation units as the input data, wherein
   the memory is configured with M internal address numbers and each of the internal address numbers corresponds to M bank numbers, where M is an integer greater than 0,
   a start bank number of a data stream stored in each of the internal address numbers is shifted by N bank numbers if the corresponding internal address number increases by one, where N is an integer greater than 0, and
   a number of bits the plurality of data is shifted is determined based on the start bank number of the corresponding internal address number of the memory; and
   wherein a first internal address y of the memory is (x %16)×16 if first data of a data stream is x, and
   a start bank number corresponding to the first internal address y is y/4+4(y %4).

2. The processor as claimed in claim 1, wherein each of the plurality of operation units includes a register configured to store a corresponding portion of the input data provided from the data interconnection unit.

3. The processor as claimed in claim 2, wherein the input data stored in the register is reused in a next data operation after being used in a current data operation.

4. The processor as claimed in claim 1, wherein an operation result from each of the plurality of operation units is stored in a region of the memory.

5. The processor as claimed in claim 4, wherein the operation result stored in the region of the memory is loaded and reused in each of the plurality of operation units.

6. The processor as claimed in claim 1, wherein the memory access pattern includes,
   a horizontal memory access pattern configured to simultaneously output a plurality of data belonging to a row of a macro block;
   a vertical memory access pattern configured to simultaneously output a plurality of data belonging to a column of the macro block; and
   a block memory access pattern configured to simultaneously output a plurality of data belonging to a region of the macro block.

7. The processor as claimed in claim 1, wherein the memory simultaneously outputs one data from each of the plurality of banks in one cycle of the data access operation.

8. The processor as claimed in claim 1, wherein the data interconnection unit includes a plurality of barrel shifters configured to shift the data output from the memory by a number of bits.

9. The processor as claimed in claim 8, wherein the number of bits shifted in the plurality of barrel shifters is determined by a start bank number corresponding to an internal address number of the memory.

10. The processor as claimed in claim 8, wherein the processor performs one of interpolation, motion estimation, and discrete cosine transform/inverse discrete cosine transform required by the codec.

11. The processor as claimed in claim 1, wherein the codec is a video codec.

12. A single-instruction multiple-data processor comprising:
    A plurality of operation units configured to execute parallel operations with input data;
    a memory configured to rearrange and store data enable a conflict free mode for a memory access pattern required by a coder-decoder(codec); and
    a data interconnection unit configured to shift the plurality of data output from the memory in a data access operation, and correspondingly provide the shifted data to the plurality of operation units as the input data, wherein
    the data is stored to the memory after being rearranged in accordance with a data permutation rule;
    the memory includes a plurality of banks configured to store data corresponding to each of the plurality of operation units,
    the memory is configured with M internal address numbers and each of the internal address numbers corresponds to M bank numbers, where M is an integer greater than 0,
    a start bank number of a data stream stored in each of the internal address numbers is shifted by N bank numbers if the corresponding internal address number increases by one, where N is an integer greater than 0, and
    a number of bits the plurality of data is shifted is determined based on the start bank number of the corresponding internal address number of the memory; and
    wherein a first internal address y of the memory is (x %16)×16 if first data of a data stream is x, and
    a start bank number corresponding to the first internal address y is y/4+4(y %4).

* * * * *